Oct. 9, 1956

G. PAVKOV 2,765,835

AIR AND LIQUID SUPPLY VALVE FOR TRACTOR TIRES

Filed Aug. 4, 1950

*INVENTOR.*
GEORGE PAVKOV
BY William Cleland

ATTORNEY

Oct. 9, 1956          G. PAVKOV          2,765,835
AIR AND LIQUID SUPPLY VALVE FOR TRACTOR TIRES
Filed Aug. 4, 1950          2 Sheets—Sheet 2
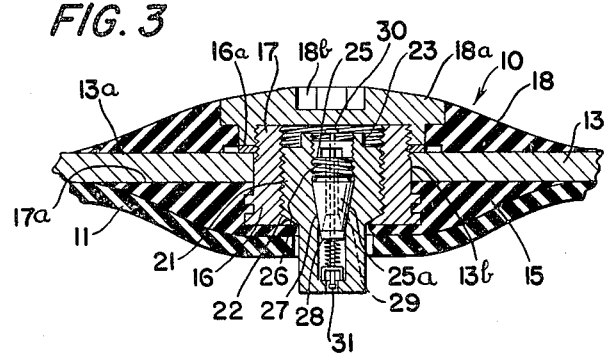
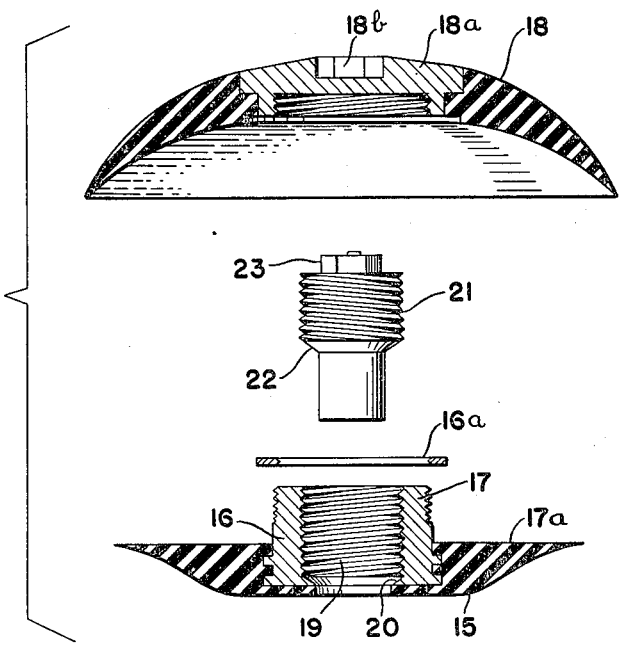
*INVENTOR.*
GEORGE PAVKOV
BY William Cleland
ATTORNEY

United States Patent Office 2,765,835
Patented Oct. 9, 1956

2,765,835

AIR AND LIQUID SUPPLY VALVE FOR TRACTOR TIRES

George Pavkov, Doylestown, Ohio

Application August 4, 1950, Serial No. 177,701

11 Claims. (Cl. 152—427)

This invention relates to an inflation valve, and in particular relates to a valve for the inner tube of a pneumatic tire of the type used on tractor wheels in which the tube contains both air and a liquid, for added weight to aid traction of the tire.

Heretofore, inner tubes have been provided with valves having elongated rubber stems adapted to project through an aperture in the wheel rim, but in tractor use in particular the stems are frequently broken off by impact with stones, tree stumps, and other obstacles. This caused great inconvenience to the tractor owner because of the difficulty in gaining access to facilities for repairing the damage or for replacing the tube.

One object of the present invention is to provide an improved valve of the character described wherein is obviated the usual difficulty of breaking the valve stem in the manner described above.

Another object of the invention is to provide a valve of the character described which requires no guards or other extraneous reinforcing means on the rim to prevent breakage of the valve stem by obstacles in the path of the wheel.

Other objects of the invention will be manifest from the following brief description and the accompanying drawings.

Of the accompanying drawings:

Figure 3 is a still further enlarged fragmentary cross-section through the valve, substantially on the line 3—3 of Figure 2.

Figure 4 is an exploded view, on the same scale as Figure 3, of the elements of the improved valve assembly.

Figure 1:
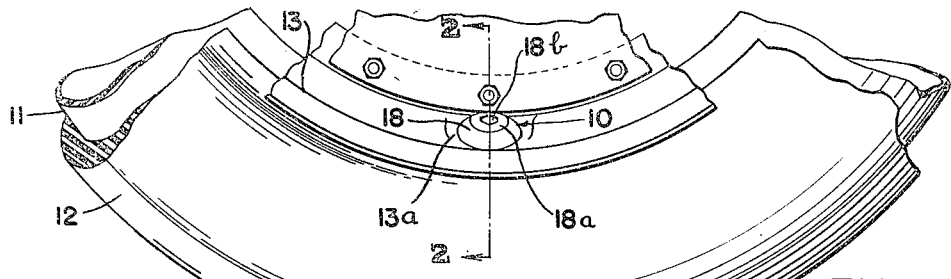
Figure 1 is a fragmentary side elevation of a tractor wheel assembly utilizing an inner tube having the improved valve incorporated thereon.
Figure 2:
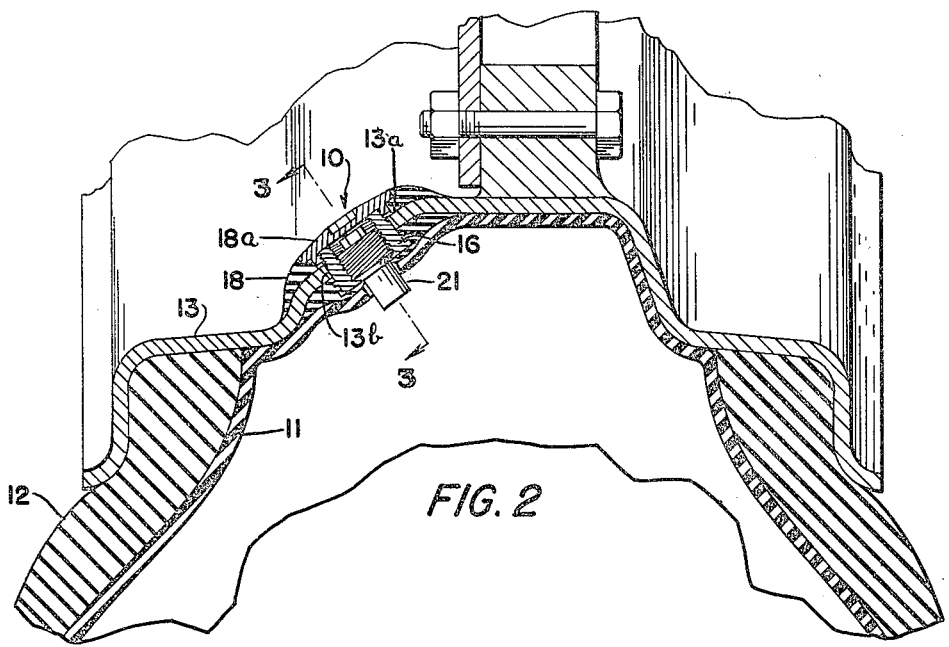
Figure 2 is an enlarged cross-section, partly broken away, taken substantially on the line 2—2 of Figure 1.

Referring to Figures 1 to 3 of the drawings, there is shown a valve assembly 10 attached in a manner to be described, to an inner tube 11 of a pneumatic tire 12 mounted on a tractor wheel rim 13 of known type.

As best shown in Figure 4, the valve 10 includes a relatively thin base 15, of rubber or like elastic material, a stem insert 16 having one end portion embedded or bonded into the base by vulcanizing or molding of the base to have a relatively short externally threaded extension 17 thereof project outwardly from a flat outer face 17a of the base, and a dome-shaped or concavo-convex cap 18 of rubber or like elastic material having an internally threaded nut 18a bonded therein, said nut being provided at the concave side of the cap with an internally threaded portion for reception on the externally threaded extension 17, while the convex side thereof has a hexagonal-shaped recess 18b therein for reception of a turning tool (not shown). The stem 16 has an internally threaded passage 19 therethrough extending from the outer end thereof to an annular seat portion 20 at the inner end of the same, for reception of an externally threaded valve insert 21 to have an annular seat 22 thereof in fluid-sealing engagement with seat 20. An integral extension 23, of hexagonal or similar shape, may be provided at the outer end of the insert 21 for engagement by a suitable turning tool (not shown).

The insert 21 has removably mounted therein a valve inside assembly or core of known type (see Figure 3), including a head 25 threaded in a passage 26 extending through insert 21, the head 25 having a conical portion 25a in air and fluid-sealing relation with a conical seat 27 in the insert. For admission of compressed air into the tire in known manner through a nozzle of an air hose (not shown), a spring-pressed closure member 28 normally closes an air passage 29 through the head, and is adapted to be yieldingly opened by engagement of said nozzle with a projecting end 30 of a pin 31 which carries the member 28.

As best shown in Figure 4 the flow area through passage 19 at the narrowest point, namely past the seat portion 20, is relatively large to facilitate filling the tire with the weighting liquid.

In use of the improved tire valve it is attached to the usual rubber inner tube 11, by vulcanizing or otherwise bonding the rubber base 15 thereto, as shown in Figures 2 and 3, wherein the tube is shown as it appears within a tire 12 mounted in a tractor wheel rim 13 in known manner, the stem 16 being held extending through an aperture in the rim, as by means of a retaining nut 16a threaded onto the outer end of the stem, to present only a relatively short externally threaded end portion of the stem outwardly of the rim. The usual rim 13 has a suitable off-set portion 13a in the wall thereof providing a flattened area surrounding the stem aperture 13b, against which the inner face of the rubber cap may be flatly engaged upon screwing the nut or insert portion 18a thereof onto the stem 16. Although the inner face of the cap may be flat, the rubber portion of the cap is shown as being concavo-convex so that it will yieldingly conform to curved or irregular shaped portions of the rim wall surrounding said valve aperture therein. In any event the cap 18 when positioned on the valve stem 16 in the manner described will lie flatly and unobtrusively against the rim wall with the convex side of the cap outwardly, whereby in normal use of the tractor over rough terrain there is little or no likelihood of any obstruction coming into contact with the cap or the stem to break or otherwise damage the valve structure.

The dome-shaped cap 18 is easily removed from the stem 16 as by inserting a suitable turning tool (not shown) within the recess 18b of the nut 18a. Upon such removal of cap 18 the nut 18a may be used as a turning tool for removal of the insert 21, by inverting the same and reciprocably engaging the hexagonal extension 23 of insert 21 within the hexagonal recess 18b of the cap. When necessary the valve inside assembly may be readily removed from the insert 21, whether the insert 21 is removed from the stem or not.

With the cap 18 and insert 21 removed, water or other liquid weighting material may be introduced to the interior of the tube, in the tire and wheel assembly, through passageway 19 of stem 16, until the desired liquid level is attained. The insert 21 together with the valve inside assembly is then threaded into the passageway 19, whereupon compressed air may be introduced into the tire through the valve insides as described above. With the tire thus inflated and weighted the cap 18 may then be replaced and the tire is ready for service.

Modifications of the invention may be resorted to without deviating from the spirit thereof or the scope of the appended claims.

What is claimed is:

1. A valve of the type used on an inner tube of a pneumatic tire mounted on a rim having the usual valve stem opening, said valve comprising an attaching inner end base portion, an outwardly extending stem anchored to said base portion and having a threaded end, said stem having a passage therethrough internally threaded from the outer end thereof, said stem having a seat within said passage inwardly spaced from said outer end thereof, a valve insert threaded in said passage from said outer end and having a seat for fluid sealing engagement with said stem seat, said insert having tool actuated turning means at the outer end thereof, a dome-shaped closure cap of elastic material having a threaded portion embedded therein for threaded engagement with said threaded end of said stem, said cap providing a flexible annular portion extending laterally outwardly of said stem.

2. A valve of the type used on an inner tube of a pneumatic tire mounted on a rim having the usual valve stem opening, said valve comprising an attaching inner end base portion of elastic material, an outwardly extending stem anchored to said base portion and having an externally threaded end, said stem having a passage therethrough internally threaded from the outer end thereof, said stem having a seat within said passage inwardly spaced from said outer end thereof, a valve insert threaded in said passage from said outer end and having a seat for fluid sealing engagement with said stem seat, said insert having tool actuated turning means at the outer end thereof, and a relatively thin button-like closure cap of elastic material having an internally threaded portion embedded therein for threaded engagement with said externally threaded end of said stem, said cap providing an annular flange portion extending laterally outwardly of said stem.

3. A valve of the type used on an inner tube of a pneumatic tire mounted on a rim having the usual valve stem opening, said valve comprising an attaching inner end base portion, an outwardly extending stem anchored to said base portion and having an externally threaded end, said stem having a passage therethrough internally threaded from the outer end to the inner end thereof, said stem having an outwardly presented seat within said passage and inwardly spaced from said outer end thereof, a valve insert threaded in said passage from said outer end and having an inwardly presented seat for fluid sealing engagement with said stem seat, said insert having tool actuated turning means at the outer end thereof, and a closure cap having an internally threaded portion for threaded engagement with said externally threaded end of said stem, said cap providing an annular flange portion extending laterally outwardly of said stem, said insert being outwardly removable from said stem passage for passing liquid therethrough, said insert having therethrough a passage for supplying compressed air inwardly of the valve, a spring-pressed valve device being removably mounted in said stem passage and yieldingly permitting ingress of compressed air but normally closing said passage in the stem against outward passage of said air.

4. A valve of the type used on an inner tube of a pneumatic tire mounted on a rim having the usual valve stem opening, said valve comprising an attaching inner end base portion, an outwardly extending stem anchored to said base portion and having an externally threaded end, said stem having a passage therethrough internally threaded from the outer end thereof, said stem having a seat within said passage inwardly spaced from said outer end thereof, a valve insert threaded in said passage from said outer end and having a seat for fluid sealing engagement with said stem seat, said valve insert having tool actuated turning means at the outer end thereof, a dome-shaped closure cap of elastic material having an internally threaded portion embedded therein for threaded engagement with said externally threaded end of said stem, said cap providing a flexible flange portion extending laterally outwardly of said stem, said embedded portion having a turning-tool receiving socket therein presented outwardly of said cap.

5. A valve of the type used on an inner tube of a pneumatic tire mounted on a rim having the usual valve stem opening, said valve comprising an attaching inner end base portion of elastic material, an outwardly extending stem anchored to said base portion and having an externally threaded end, said stem having a passage therethrough internally threaded from the outer end thereof, said stem having a seat within said passage inwardly spaced from said outer end thereof, a valve insert threaded in said passage from said outer end and having a seat for fluid sealing engagement with said stem seat, said insert having tool actuated turning means at the outer end thereof, and a relatively thin button-like closure cap of elastic material having an internally threaded portion embedded therein for threaded engagement with said externally threaded end of said stem, said cap providing a flexible elastic flange portion of broad lateral area extending outwardly of said stem, said embedded portion having a turning-tool receiving socket presented outwardly of said cap.

6. A valve of the type used on an inner tube of a pneumatic tire mounted on a rim having the usual valve stem opening, said valve comprising an attaching inner end base portion, an outwardly extending stem anchored to said base portion and having an externally threaded end, said stem having a passage therethrough internally threaded from the outer end thereof, said stem having a seat within said passage inwardly spaced from said outer end thereof, a valve insert threaded in said passage from said outer end and having a seat for fluid sealing engagement with said stem seat, said insert having tool actuated turning means at the outer end thereof, and a closure cap having an internally threaded portion for threaded engagement with said externally threaded end of said stem, said cap providing a flexible elastic flange portion of broad lateral area extending outwardly of said stem, said valve insert being outwardly removable from said stem for passage of liquid therethrough, said valve insert having therethrough a passage for compressed air and having a spring-pressed valve device normally closing the same against outward passage of air, said internally threaded cap portion having a turning-tool receiving socket presented outwardly of said cap.

7. A valve of the type used on an inner tube of a pneumatic tire mounted on a rim having the usual valve stem opening, said valve comprising an attaching inner end base portion, an outwardly extending stem anchored to said base portion and having an externally threaded end, said stem having a passage therethrough internally threaded from the outer end thereof, said stem having a seat within said passage inwardly spaced from said outer end thereof, a valve insert threaded in said passage from said outer end and having a seat for fluid sealing engagement with said stem seat, said insert having tool actuated turning means at the outer end thereof, and a dome-shaped closure cap of elastic material having an internally threaded portion embedded therein for threaded engagement with said externally threaded end of said stem, said cap providing a flexible elastic flange portion of broad lateral area extending outwardly of said stem, the inner face of said cap including the flanged portion thereof being concave in normal molded shape of the elastic material thereof.

8. A valve of the type used on an inner tube of a pneumatic tire mounted on a rim having the usual valve stem opening, said valve comprising an attaching inner end base portion, an outwardly extending stem anchored to said base portion and having an externally threaded end, said stem having a passage therethrough internally threaded from the outer end thereof, said stem having a seat within said passage inwardly spaced from said outer end thereof, a valve insert threaded in said passage from said outer end and having a seat for fluid sealing engagement with said stem seat, said insert having tool actuated turning means at the outer end thereof, and a closure cap having an internally threaded portion for threaded engagement with said externally threaded end of said stem, said cap providing a flexible elastic flange portion of broad lateral area extending outwardly of said stem, said valve insert being outwardly removable from said stem for passage of liquid therethrough, said valve insert having therethrough a passage for compressed air and having a spring-pressed valve device normally closing the same against outward passage of air, said cap including the flanged portion thereof being of vulcanized rubber, the normal vulcanized shape of said cap being generally concavo-convex.

9. A valve of the type used on an inner tube of a pneumatic tire mounted on a rim having the usual valve stem opening, said valve comprising an attaching inner end base portion, an outwardly extending stem anchored to said base portion and having an externally threaded end, said stem having a passage therethrough internally threaded from the outer end thereof, said stem having a seat within said passage inwardly spaced from said outer end thereof, a valve insert threaded in said passage from said outer end and having a seat for fluid sealing engagement with said stem seat, said insert having tool actuated turning means at the outer end thereof, and a closure cap having embedded therein an internally threaded portion for threaded engagement with said externally threaded end of said stem, said cap providing a flexible elastic flange portion of broad lateral area extending outwardly of said stem, said valve insert being outwardly removable from said stem for passage of liquid therethrough, said valve insert having therethrough a passage for compressed air and having a spring-pressed valve device normally closing the same against outward passage of air, said embedded portion of the cap having a turning-tool receiving socket presented outwardly of said cap, the inner face of the cap being concave in normal molded shape of the elastic material thereof.

10. In combination a rim, a tire on said rim, an inner tube in said tire, a valve on said inner tube, said valve including a base portion and a stem portion with a passageway of substantial flow area through the base end stem portion for passage of liquid therethrough, said valve being attached to the inner tube to project through the valve rim hole a short distance radially inward thereof, means in the form of a thin nut removably attached to said stem portion for holding said base portion in position relative to said rim, a valve core housing having an air passageway therethrough, means for removably mounting said valve core housing in said passageway through the base and stem portions, said housing having one end substantialy flush with the axial outer end of said base portion and the other end extending a distance beyond the axial inner end of the stem portion, a valve core removably mounted in said housing for controlling passage of air therethrough, a dome-shaped cap removably attached to the outer end of said stem portion beyond said rim, said cap having a lowered crown and being adapted to provide a cover for said stem portion and housing and to prevent injury to them by presenting a low angle surface to stones and other objects which come into contact with said cap.

11. The combination with an inflatable pneumatic tire and rim assembly having a wall structure, a valve therefor comprising a base portion having a passageway of substantial flow area at its narrowest point for passage of liquid therethrough, said base including a relatively short stem portion for projecting a short distance through said wall structure, means on said base for attaching the same in anchored position relative to said wall structure with said stem projecting therethrough, a valve core housing having therethrough an air passageway of relatively small flow area, cooperating means on said base and said housing for removably mounting the housing in said base portion passageway to have one outer end of the housing presented at the outer end of the stem portion, said valve core housing having an inner end portion thereof protruding inwardly through said base portion, said valve core housing having its passageway positioned to open inwardly of said wall structure when the valve is incorporated therein, a valve core releasably and removably secured in said housing passageway for controlling passage of air therethrough, a dome-shaped cap removably attached to outer end of said stem portion and adapted to engage against an outer surface portion of said wall structure and to close said base portion passageway at the outer end thereof, said cap having a lowered crown and being adapted to provide a cover for said base and valve core housing to prevent injury to the same by presenting a low angle surface to stones and other objects which come into contact with said cap, said cooperating means including a threaded connection in said stem portion, said housing having a portion presented at the outer end of said base passageway and engageable when said cap is removed from said stem for removing the housing from the stem.

References Cited in the file of this patent

UNITED STATES PATENTS

| | | |
|---|---|---|
| 612,380 | Clark | Oct. 11, 1898 |
| 616,610 | Gibson | Dec. 27, 1898 |
| 621,849 | Rickman | Mar. 28, 1899 |
| 751,402 | McKay | Feb. 2, 1904 |
| 1,355,271 | Roberts | Oct. 12, 1920 |
| 1,711,382 | Goldburg | Apr. 30, 1929 |
| 2,222,047 | Snyder | Oct. 19, 1940 |
| 2,326,998 | Hosking | Aug. 17, 1943 |